June 16, 1959 W. F. STREHLOW 2,890,892
INTERCHANGEABLE FRONT END STRUCTURE FOR TRACTORS
Filed April 22, 1957 2 Sheets-Sheet 1
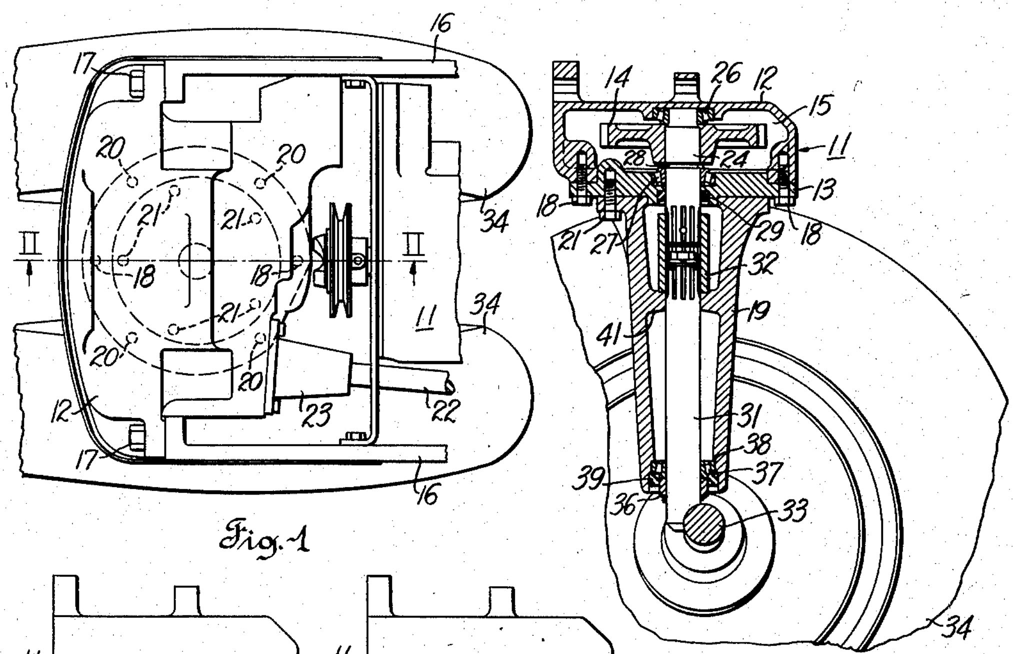
Fig. 1
Fig. 2
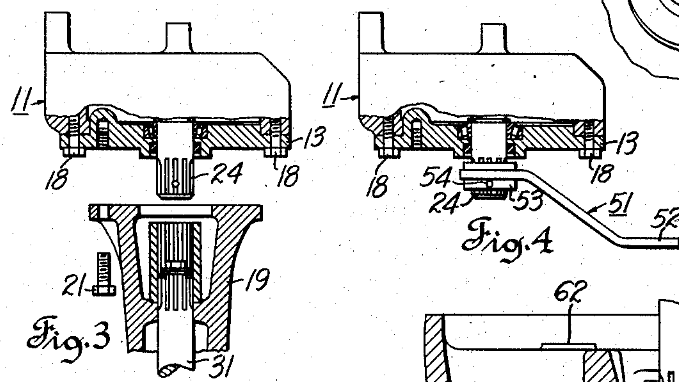
Fig. 3
Fig. 4
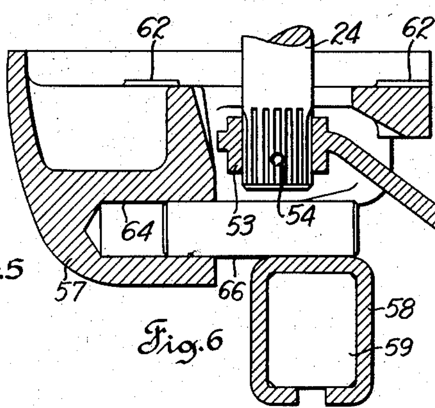
Fig. 5
Fig. 6
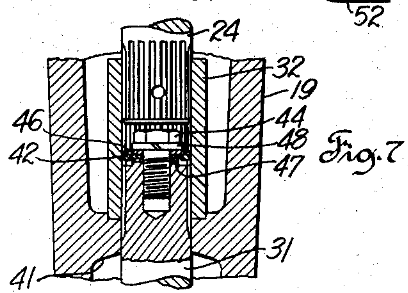
Fig. 7
Inventor
Walter F. Strehlow
By John P. Hines
Attorney INTERCHANGEABLE FRONT END STRUCTURE FOR TRACTORS
Filed April 22, 1957
2 Sheets-Sheet 2
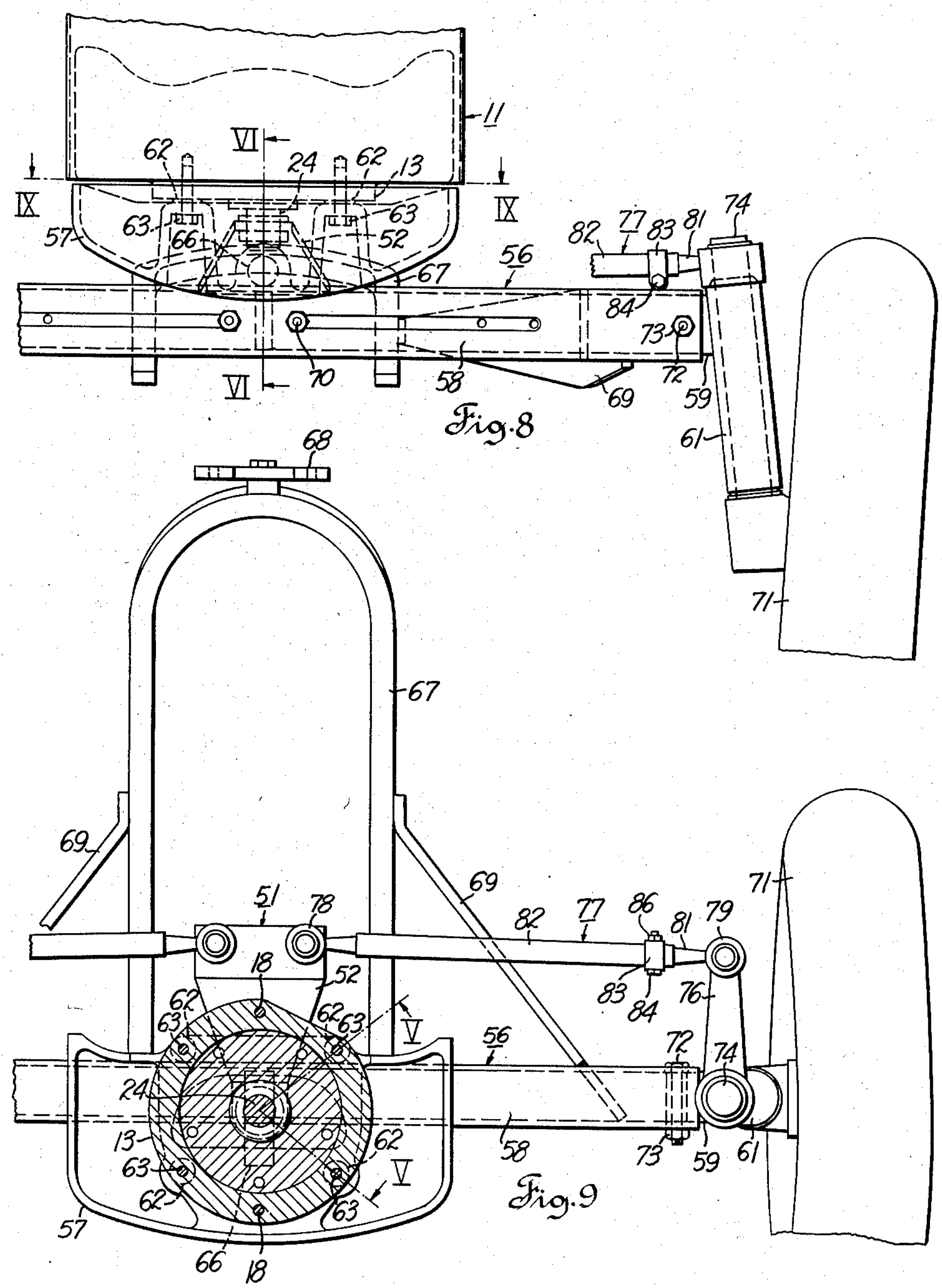
Inventor
Walter F. Strehlow
By John P. Hines
Attorney United States Patent Office 2,890,892

Patented June 16, 1959

1

2,890,892

INTERCHANGEABLE FRONT END STRUCTURE FOR TRACTORS

Walter F. Strehlow, Wauwatosa, Wis., assignor to Allis-Chalmers Manufacturing Company, Milwaukee, Wis.

Application April 22, 1957, Serial No. 654,175

6 Claims. (Cl. 280—92)

This invention pertains to front end structures for vehicles and more particularly to an improved front end structure for farm tractors which is adapted to readily receive different types of front support assemblies.

There are two main types of tractors commonly in use today: (1) the tricycle or row crop type tractor having a front support assembly comprising either a single or pair of closely spaced steerable ground engaging wheels mounted at the bottom of an elongated support member or pedestal which is attached to the front end structure of the tractor, and (2) the conventional type tractor having a front support assembly comprising a pair of widely spaced steerable ground engaging wheels mounted on opposite ends of a transversely extending front support member or axletree which is pivotally mounted at its center portion to the tractor front end structure.

Each of these tractors has characteristics which make it more desirable for particular farm operations. In some instances, such as harvesting tall row crops, the conventional type tractor cannot be used because of limited clearance under the axletree. However, in most instances where the axletree provides sufficient crop clearance, the conventional type tractor is to be preferred because of its superior stability and ease of steering compared with the tricycle type tractor. Since each type of tractor is better suited for a particular type of work, it was found necessary to provide tractors with a front end structure that was adapted to receive either a tricycle type front support assembly or a conventional type front support assembly. In this manner a farmer may have the particular advantages of both types of tractors at a cost which is considerably less than owning two tractors.

It is therefore one of the primary objects of the invention to provide a tractor having the advantages of both the conventional and the tricycle type of front support assemblies.

Another object of the invention is to provide a tractor with a front end structure to which steering linkage for either a conventional or tricycle type tractor may be easily attached.

A further object of the invention is to provide a front end structure for tractors to which either a tricycle type front support member or a conventional type front support member may be easily attached.

Another object of the invention is to provide a tractor of the hereinbefore mentioned character wherein the change from one type of front support assembly to the other can be made without draining lubricating oil from the front end structure.

Another object of the invention is to provide a front end structure of the hereinbefore mentioned character which is inexpensive to manufacture, sturdy in construction and one which can be changed to either type of tractor front support assembly in a short period of time.

2

A further object of the invention is to provide a novel front support assembly for a tricycle type tractor wherein the front support member and the steering linkage are removable from the tractor as a unit.

Another object of the invention is to provide a front support assembly for a tricycle type tractor of the hereinbefore mentioned character wherein the steering linkage is removably attached to the front support member.

A further object of the invention is to provide a novel front support assembly for a tricycle type tractor including a support member and steering linkage wherein the support member supports substantially all of the front end weight of the tractor.

Objects and advantages other than those above set forth will be apparent from a consideration of the following description when read in connection with the accompaning drawings, in which:

Fig. 1 is a top view of the tractor front end structure with the tricycle type front support assembly attached thereto;

Fig. 2 is a section taken through the line II—II in Fig. 1.

Fig. 3 is a partial reproduction of Fig. 2 showing the tricycle type front support assembly detached from the front end structure;

Fig. 4 is a reproduction of Fig. 3 without the tricycle type front support assembly and showing a steering arm for the conventional type tractor attached to the front end structure;

Fig. 5 is a section taken through the line V—V in Fig. 9;

Fig. 6 is a section taken through the line VI—VI in Fig. 8;

Fig. 7 is an enlarged view of the steering connection shown in Fig. 2;

Fig. 8 is a front view of the tractor front end structure showing the conventional type front support assembly attached thereto; and Fig. 9 is a top view, partially in section, taken through the line IX—IX in Fig. 8.

Referring to Figs. 1, 2 and 3, a tractor front end structure 11 is shown comprising a substantially rectangular box shaped housing 12, a circular mounting plate 13 releasably attached to the housing 12 and covering a circular opening in the bottom of the housing and a worm wheel or steering means 14. The front end structure 11 is supported between a pair of laterally spaced longitudinally disposed channels 16 which comprise the tractor frame. A pair of cap screws 17 rigidly secure the housing 12 to the front ends of the channels 16.

In the preferred embodiment of the invention, plate 13 has an outer circle of six through holes and an inner circle of five tapped holes which do not extend through plate 13. The inner circle of holes will be referred to in the future as blind holes. Two cap screws 18 and four cap screws 20 pass through the holes in the outer circle and are threaded into aligned holes tapped into the bottom of the housing 12 around the circular opening in the housing. When attached by tightening the cap screws 18 and 20, the plate 13 and housing 12 form an oil tight lubricating compartment 15 for a worm (not shown) and the worm wheel 14. The inner circle of five tapped blind holes is used in attaching a pedestal or front support member 19 to the plate 13. It should be noted that neither the cap screws 18 and 20 nor cap screws 21, which attach the pedestal 19 to the plate, pass into the oil compartment 15 and therefore the pedestal may be removed from the plate by removing the five cap screws 21 and the four cap screws 20 may be removed from the housing without danger of oil draining from the compartment 15. The two remaining cap screws 18 exert sufficient force to seal the plate 13 to the housing 12.

A steering wheel shaft 22 secured for rotation with the tractor steering wheel (not shown) extends into the oil tight compartment 15 through a conical sleeve 23 bolted to the housing 12. This sleeve 23 is so positioned that the worm (not shown) secured to the forward end of the shaft 22, for rotation therewith, is constantly in mesh with the worm wheel 14. The necessary antifriction bearings for rotation of the worm are contained within the housing 12 and an oil seal in the sleeve 23 keeps oil from seeping past the steering shaft 22.

The worm wheel 14 is mounted for rotation, about a vertical axis, on a short stub shaft 24 which has its upper end journaled in a conventional roller bearing 26 pressed into a bearing support portion of the downwardly projecting surface of the upper side of housing 12. The stub shaft 24 extends vertically downward through plate 13 and has its lower portion journaled in another conventional roller bearing 27 which is pressed into a bearing support portion of the upwardly projecting surface of plate 13. A snap ring 28 held in a groove formed on the periphery of stub shaft 24 bears against the upper surface of bearing 27 and retains the stub shaft 24 from slipping through plate 13. The plate 13 is provided with an oil seal 29 which surrounds shaft 24 and resists seepage of oil from the oil compartment 15.

It will be more apparent as the description of applicant's invention progresses that the front end structure just described is adapted to quickly and easily receive the necessary elements to convert a tricycle type tractor to a conventional type tractor without the necessity of draining lubricating liquid from the oil compartment 15. With the worm and worm wheel 14 contained within the oil tight compartment 15 they are assured of proper lubrication and can be expected to perform satisfactorily over a long period of time. It should be noted, however, that if the occasion arises the worm wheel 14 and stub shaft 24 can easily be removed with the plate 13. This is accomplished by removing the cap screws 18 and 20 and dropping plate 13 from the housing 12. The opening provided in housing 12 is sufficiently large to allow removal of worm wheel 14 as stub shaft 24 is slipped from bearing 26.

Fig. 2 shows the tricycle type front support assembly which is composed of the front support member or pedestal 19, and the steering linkage carried thereby which comprises a steering shaft 31 mounted within the pedestal for rotation about a vertical axis relative to the pedestal and a splined sleeve or coupling 32 releasably secured to the upper end of steering shaft 31 for rotation therewith. A wheel spindle 33 welded to the lower end of shaft 31 and extending transversely thereof operably mounts a pair of steerable ground engaging wheels 34. The steering shaft 31 is provided with an abutment surface shown herein as a collar 36 preferably welded to the shaft 31 immediately above the wheel spindle 33. To provide for ease of steering, a conventional roller bearing 37 is pressed onto shaft 31 in abutting relation to the upper side of collar 36. The shaft 31 is threaded upwardly into pedestal 19 until the upper surface of bearing 37 contacts a radially projecting shoulder 38 formed on the lower inside surface of pedestal 19. A seal 39 is provided between the bearing 37 and lower end of pedestal 19 to protect bearing 37 from dust and other harmful matter.

The upper end of steering shaft 31 projects upwardly into pedestal 19 and terminates immediately above a radially disposed circular web 41. A hole through the center of the web is sufficiently large to allow insertion of the steering shaft 31 and to provide clearance for the steering shaft to rotate relative to the web.

A novel and inexpensive means is provided to connect the coupling 32 in motion transmitting relation with steering shaft 31 and to retain the steering shaft 31 within pedestal 19. The upper end of shaft 31 (best shown in Fig. 7) is provided with splines which mate with the splines formed on the inside surface of sleeve 32. A snap ring 42 is held in an annular groove cut into the inside surface of sleeve 32 and this snap ring fits over a stepped diameter formed on the upper end of shaft 31. A cap screw 44 threaded axially into the end of shaft 31 holds a thrust washer 46 securely against the upper surface of snap ring 42 and thereby holds the steering shaft 31 from downward vertical movement relative to the sleeve 32. With the lower end of sleeve 32 in abutting relation with the upper surface of web 41 the steering shaft 31 is held from downward movement relative to the pedestal 19. In order to assure proper adjustment of bearing 37, a number of shims 47 are provided between the washer 46 and the top of shaft 31. By increasing the number of shims 47 and upon tightening the cap screw 44, the steering shaft 31 is drawn upward relative to the pedestal 19. If the correct number and size of shims are employed the rollers of bearing 37 will be in proper contact with the outer bearing race when the bottom of thrust washer 46 is in contact with the top surface of snap ring 42. A lock washer 48 is positioned between the head of cap screw 44 and washer 46 to resist loosening of the cap screw 44.

It should be noted that although the contact between the lower end of sleeve 32 and the upper surface of web 41 restrains the steering shaft 31 from downward movement relative to the pedestal 19 virtually no load is transmitted between these two surfaces and no appreciable frictional force is built up if the proper bearing adjustment has been reached by using the correct number of shims 47. The upward force which is a reaction to the weight of the front end of the tractor is passed through the collar 36 and antifriction bearing 37 to the pedestal and not through the sleeve 32. It thus follows that the steering train for the tricycle type tractor, as best shown in Fig. 2, from the worm wheel 14 to the steerable ground engaging wheels 34 is mounted in the three antifriction bearings 26, 27 and 37 resulting in a front support assembly for tricycle type tractors which is not only inexpensive to manufacture and long lasting but one which affords a steering connection which is comparatively free of friction and hence easy to operate.

A further advantage of this front support assembly for tricycle type tractors results from positioning the lower antifriction bearing 37 immediately adjacent and above the wheel spindle 33. Since farm tractors are frequently driven over rough terrain the front support assembly is subjected to large shock forces directed against the wheel spindle 33 varying in direction from a three o'clock position to a nine o'clock position. These shock forces tend to break the front support assembly off at its connection to the front end structure 11. In the preferred embodiment this breaking force would be dissipated over the large contact surface between pedestal 19 and plate 13. Because of the length of pedestal 19, which is necessary to provide the tractor front end with substantially equal height relative to the rear of the tractor, the pedestal acts as a lever arm and the shock forces are multiplied considerably at the connection between the pedestal 19 and the plate 13. Since the shock forces pass through the steering shaft 31 and bearing 37 into pedestal 19 before they are multiplied by the length of pedestal 19 the bearing 37 and steering shaft 31 can be of much lighter construction and of considerably less expense than would be the case if they were subjected to the multiplied shock forces at the plate 13. Of even greater importance is the fact that the steering mechanism, common to both types of front support assemblies, including the bearings 26 and 27, the stub shaft 24, the worm wheel 14 and worm (not shown) are not subjected to these multiplied shock forces.

It should also be pointed out that although some of the unmultiplied shock forces acting against spindle 33 are passed into steering shaft 31 in the form of bending stresses these stresses are not carried into stub shaft 24.

As was previously mentioned, the clearance provided between web 41 and steering shaft 31 is sufficient to allow relative rotation. However, this clearance is of a sufficiently close tolerance that any bending stresses in shaft 31 are dissipated by contact between shaft 31 and web 41 before they are passed onto stub shaft 24. It thus follows that virtually no force other than a steering force is carried by the steering mechanism common to both types of front support assemblies.

Although the front support assembly for tricycle type tractors shown in Fig. 2 is more expensive than the type wherein the steering shaft also supports the weight of the tractor, when it is considered that only a minor portion of the tractors sold today are of the tricycle type this added expense does not appreciably detract from the savings afforded by the light weight construction of the steering mechanism components which are common to both the tricycle and conventional type tractors. As will become apparent as the description of the invention progresses, none of the steering mechanism components common to both types of tractor are subject to any force other than the normal steering forces when the conventional type front support assembly is attached to the front end structure 11. Without applicant's novel front end structure and tricycle type front support assembly it would be necessary to construct the steering mechanism common to both types of front support assemblies so that it would withstand both the weight of the front portion of the tractor and the multiplied shock forces applied thereto. This would necessarily result in a more expensive tractor.

With reference to Fig. 4 after the five cap screws 21 are removed from plate 13 the front support assembly for the tricycle type tractor is removed and a steering arm or coupling 51 is attached thereto. This arm consists of an elongated flat lever 52 which projects downward and rearward from a bushing 53 formed on the forward end of the arm 51 and which is connected in torque transmitting relation to the lower end of stub shaft 24. The inside surface of bushing 53 is provided with splines which mate with the splines formed on the lower end of stub shaft 24 and is held from downward vertical movement relative to stub shaft 24 by a conventional roll pin 54. The rearward end of lever 52 lies in a horizontal plane and swings within this plane as the stub shaft 24 is rotated about its vertical axis.

Referring to Figs. 5 through 9 a front support member or axletree 56 for the conventional type tractor is composed of a casting 57, an axle housing 58, an axle 59 and a steering shaft housing 61. The casting 57 is preferably designed to conform with the general contour of the front of the tractor and present a pleasing appearance. Functionally it is a generally hollow casting provided with four mounting surfaces 62 which are preferably equally spaced from one another and are centered on the casting 57. It is necessary before attaching casting 57 to the front end structure 11 to remove the four cap screws 20 from housing 12 to provide mounting space for the four longer cap screws 63 which attach the casting 57 to housing 12. The two remaining cap screws 18 retain the plate 13 in sealing relation with the housing 12 and inasmuch as neither cap screws 20 nor 63 pass into the oil compartment 15, no oil is lost in changing from one type of front support member to the other.

An elongated circular aperture 64 (best shown in Fig. 6) having its forward end closed is provided in the lower portion of casting 57 preferably spaced equidistant from the sides of the casting. This aperture 64 receives the forward portion of a pivot pin 66 which is rigidly connected to the top side of the elongated axle housing 58 equidistant from the ends of the housing. The axes of pin 66 and housing 58 are at right angles to one another and by allowing pin 66 to rotate about its axis within aperture 64 housing 58 is free to swing in a vertical plane transverse to the longitudinal axis of the tractor. This insures proper ground contact between front steerable wheels 71 of the conventional type tractor when uneven ground surfaces are traversed.

Referring to Fig. 9 a U-shaped support member or radius rod 67 rigidly attached to the axle housing 58 extends rearwardly therefrom and is removably and pivotally attached to the tractor frame (not shown) by a bracket 68. Two support struts 69 rigidly attached between the axle housing 58 and radius rod 67 give added strength to the radius rod and axle housing 58.

Inasmuch as both front ground engaging steerable wheels 71 and their corresponding steering and supporting structures are the same in the conventional type tractor only one side of this front support assembly has been shown. Referring to Figs. 8 and 9 the axle 59 is securely fastened to the inside of axle housing 58 and is held from extension and contraction relative to the axle housing by a cap screw 70 which is threaded into axle 59 and by a bolt 72 which passes through both axle 59 and axle housing 58 and is held in place by nut 73. Their complementary rectangular cross sections hold axle 59 and axle housing 58 from relative rotation. A more complete description of the method of contracting and extending axle 59 relative to axle housing 58 can be found in applicant's copending United States application, S.N. 616,690.

The steering shaft 74 for the conventional type tractor will be referred to hereinafter as a king pin to avoid confusion with the steering shaft 31 for the tricycle type tractor. This king pin 74 is mounted within housing 61 for rotation about a substantially vertical axis. The lower end of king pin 74 is connected in a conventional manner to a wheel spindle (not shown) so as to transmit a steering motion to the steerable ground engaging wheel 71. Secured to the top of king pin 74 for rotation therewith in a horizontal plane is a crank arm 76. This crank arm extends rearwardly from its rigid connection to king pin 74 and is connected to steering lever 52 by a telescoping link or tie rod structure 77. The crank arm 76 and tie rod structure 77 comprise the means connecting coupling 51 and king pin 74 in motion transmitting relation. Conventional ball and socket joints 78 and 79 connect opposite ends of tie rod structure 77 to steering lever 52 and crank arm 76 respectively.

Tie rod structure 77 consists of an inner link 81 which is slidably contained within a hollow outer link 82 so as to allow tie rod structure 77 to be adjusted lengthwise to correspond to the adjusted length of axletree 56. Outer hollow link 82 is split along its length so that it will hold inner link 81 in any one of a number of adjusted extended or contracted positions by clamp 83. Bolt 84 and nut 86 provide clamp 83 with the necessary clamping force.

It should be noted that the weight of the front end of the conventional type tractor and the shock forces applied thereto because of the rough terrain traversed by tractors is carried by the components of the axletree 56 and not by the steering machanism common to both types of front support assemblies. As was previously pointed out this is also true of the tricycle type tractor front support assembly and it therefore follows that the steering mechanism common to both types of tractor front support assemblies will be longer lived, easier to operate, and less expensive to manufacture.

The method of using this invention is both apparent and uncomplicated. The tricycle type tractor front support assembly is removed by relieving the front support member 19 of the weight of the front end of the tractor and removing the five cap screws 21. This allows sleeve 32 to be slipped from stub shaft 24 and the complete front support assembly for the tricycle type tractor is removable as a unit. Since the cap screws 21 do not protrude into the oil compartment 15 no oil is lost when the tricycle type front support assembly is removed. It should be noted here that stub shaft 24 extends only a short distance beneath plate 13 and will not therefore interfere with proper crop clearance when the conventional type front support assembly is being used.

The next step is to position steering arm 51 on the splined end of stub shaft 24 and hold it in place with roll pin 54. Following this the four cap screws 20 are removed and casting 57 is rigidly held against plate 13 by the four longer cap screws 63 which are threaded into housing 12. Again no oil is lost as the tapped holes receiving both cap screws 20 and 63 do not open into oil compartment 15 and cap screws 18 retain the proper sealing force between plate 13 and housing 12. With the casting 57 securely held in place the axletree 56 is fitted into place by slipping pivot pin 66 into aperture 64. After bracket 68 is bolted to the tractor frame the tie rod structure 77 is connected through the ball and socket joint 78 to lever 52 and the changeover from the tricycle tractor to the conventional type tractor is complete. When changing from the conventional type tractor to the tricycle type tractor the reverse procedure is followed.

It should be understood that it is not intended to limit the invention to the exact details of construction herein described with reference to the drawings, and it is intended to include such other forms and modifications as are embraced by the appended claims.

What is claimed is:

1. In a tricycle type tractor having a longitudinally disposed frame, a housing rigid with a forward portion of said frame, a steering means contained within such housing, a vertically disposed pedestal releasably secured to said housing, a steering shaft including a transversely extending wheel spindle rigid with the lower end thereof and a steerable ground engaging wheel operably mounted on said spindle, the combination comprising: a stub shaft operably connected to said steering means for rotation about a vertical axis and having one end portion extending beneath said housing and terminating adjacent thereto; an abutment surface on said pedestal; and a coupling nonrotatably secured to the upper end of said steering shaft and contacting said abutment surface to hold said steering shaft from downward vertical movement relative to said pedestal, said coupling being releasably connected to said stub shaft to transmit steering movement to said steerable wheel.

2. In a tricycle type tractor having a longitudinally disposed frame, a housing rigid with a forward portion of said frame, a steering means contained within said housing, a vertically disposed pedestal releasably secured to said housing, a steering shaft carried by said pedestal for rotation about a vertical axis and having a transversely disposed wheel spindle connected to the lower end thereof and a steerable ground engaging wheel operably mounted on said spindle, the combination comprising: a stub shaft connected to said steering means for rotation about a vertical axis and having one end portion extending through the bottom of said housing and terminating adjacent thereto; an abutment surface on said pedestal; a coupling; fastening means releasably connecting said coupling to the upper end of said steering shaft, said coupling contacting said abutment surface to hold said steering shaft from downward vertical movement relative to said pedestal, said fastening means being adjustable to selectively vary the vertical position of said steering shaft relative to said pedestal, and said coupling being engaged with said stub shaft when said pedestal is attached to said housing to transmit a steering motion to said steerable wheel.

3. In a tricycle type tractor having a longitudinally disposed frame, a housing rigid with a forward portion of said frame, a steering means rotatably contained within said housing, a vertically disposed pedestal releasably connected to the bottom of said housing, a steering shaft carried by said pedestal for rotation relative thereto about a vertical axis and having a transversely disposed wheel spindle connected to the lower end thereof and a steerable ground engaging wheel operably mounted on said spindle, the combination comprising: a stub shaft connected to said steering means for rotation about a vertical axis and having one end portion extending through the bottom of said housing and terminating adjacent thereto; a first abutment surface on the upper portion of said pedestal; a coupling nonrotatably secured to the upper end of said steering shaft, said coupling contacting said abutment surface to hold said steering shaft from downward vertical movement relative to said pedestal; a second abutment surface on said pedestal spaced beneath said first abutment surface; and bearing means rigidly secured to a lower portion of said steering shaft and contacting said second abutment surface to hold said steering shaft from upward vertical movement relative to said pedestal, said coupling being releasably engaged with said stub shaft to transmit steering movement to said steerable wheel.

4. A tractor front end structure of the type wherein a vertically disposed elongated pedestal member or a transversely extending axletree member may be interchangeably attached to said structure, and wherein said pedestal member mounts a steerable ground engaging wheel, said axletree member mounts two widely spaced steerable ground engaging wheels and each of said members mounts steering linkage to transmit steering motion to their respective steerable wheels, said front end structure comprising: a fully enclosed housing having a mounting surface formed on the bottom thereof, said mounting surface being adapted to receive said pedestal member or said axletree member; a steering means rotatably contained within said housing; and a stub shaft operatively connected to said steering means for rotation about a vertical axis and having one end portion extending through and terminating adjacent to said mounting surface, said one end portion of said stub shaft being adapted for alternate connection to said steering linkages.

5. A tractor front end structure of the type wherein a vertically disposed elongated pedestal member or a transversely extending axletree member may be interchangeably attached to said structure, and wherein said pedestal member mounts a steerable ground engaging wheel, said axletree member mounts two widely spaced steerable ground engaging wheels and each of said members mounts steering linkage to transmit steering motion to their respective steerable wheels, said front end structure comprising: a housing; a plate releasably secured to the bottom of said housing defining with said housing a fully enclosed compartment, said plate being adapted to alternately receive said pedestal member or said axletree member; a steering means rotatably contained within said compartment; and a stub shaft connected to said steering means for rotation about a vertical axis and having one end portion extending through and terminating adjacent to said plate, said one end portion being adapted for alternate connection to said steering linkages.

6. A tractor front end structure of the type wherein a vertically disposed pedestal member or a transversely extending axletree member may be interchangeably attached to said structure and wherein said pedestal member mounts a steerable ground engaging wheel, said axletree member mounts two widely spaced steerable ground engaging wheels and each of said members mounts steering linkage to transmit steering motion to their respective steerable wheels, said front end structure comprising: a housing; a plate releasably attached to the bottom of said housing and forming with said housing a fully enclosed compartment, said plate being adapted for attachment of said pedestal member, said compartment being adapted for attachment of said axletree member; a steering means rotatably contained within said compartment; and a stub shaft connected to said steering means for rotation about a vertical axis and having one end portion extending through and terminating adjacent said plate, said one end portion being adapted for alternate connection to said steering linkages.

References Cited in the file of this patent

UNITED STATES PATENTS

| | | |
|---|---|---|
| 1,776,409 | Beatty | Sept. 23, 1930 |
| 2,002,002 | Brown et al | May 21, 1935 |
| 2,074,685 | Engstrom | Mar. 23, 1937 |
| 2,175,965 | Madden | Oct. 10, 1939 |
| 2,208,599 | Ronning | July 23, 1940 |
| 2,301,152 | Strehlow | Nov. 3, 1942 |
| 2,394,854 | Goodman | Feb. 12, 1946 |
| 2,779,425 | Miller | Jan. 29, 1957 |